United States Patent
Laherty et al.

(10) Patent No.: US 9,596,739 B2
(45) Date of Patent: Mar. 14, 2017

(54) DISTRIBUTED CONTROL OF LIGHTS SUBJECT TO COMPLIANCE CONSTRAINTS

(71) Applicant: Cisco Technology, Inc., San Jose, CA (US)

(72) Inventors: Matthew A. Laherty, Bloomington, IN (US); John D. Parello, Campbell, CA (US); William MacGowan, Toronto (CA); Charles Calvin Byers, Wheaton, IL (US); Xiaohang Li, Cupertino, CA (US); Luis O. Suau, Davie, FL (US); Donald Schriner, Fishers, IN (US)

(73) Assignee: Cisco Technology, Inc., San Jose, CA (US)

( * ) Notice: Subject to any disclaimer, the term of this patent is extended or adjusted under 35 U.S.C. 154(b) by 83 days.

(21) Appl. No.: 14/448,249

(22) Filed: Jul. 31, 2014

(65) Prior Publication Data

US 2016/0037613 A1  Feb. 4, 2016

(51) Int. Cl.
*H05B 37/02* (2006.01)
*G06F 21/30* (2013.01)

(52) U.S. Cl.
CPC ....... *H05B 37/0272* (2013.01); *G06F 21/305* (2013.01); *H05B 37/0263* (2013.01); *Y02B 20/445* (2013.01)

(58) Field of Classification Search
None
See application file for complete search history.

(56) References Cited

U.S. PATENT DOCUMENTS

| | | |
|---|---|---|
| 8,255,487 B2 | 8/2012 | Valois |
| 8,334,901 B1 | 12/2012 | Ganick et al. |
| 8,352,769 B1 | 1/2013 | Ghose et al. |
| 8,432,438 B2 | 4/2013 | Ryan et al. |
| 8,436,896 B2 | 5/2013 | Staats et al. |
| 8,457,502 B2 | 6/2013 | Ryan et al. |
| 8,570,160 B2 | 10/2013 | Speegle et al. |
| 8,588,809 B2 | 11/2013 | Seavey et al. |
| 8,732,501 B1 | 5/2014 | Ghose et al. |
| 8,745,429 B2 | 6/2014 | Ghose et al. |

(Continued)

OTHER PUBLICATIONS

Cooper Lighting, "A Commercial Emergency Light," Product Selection Guide | Sixth Edition, retrieved from http://www.cooperindustries.com/content/dam/public/lighting/products/documents/atlite/spec_sheets/at-a-commercial-emergency-light-psgpage.pdf, on Jul. 30, 2014, 1 page.

(Continued)

*Primary Examiner* — Crystal L Hammond
(74) *Attorney, Agent, or Firm* — Edell, Shapiro & Finnan, LLC

(57) ABSTRACT

A lighting control system is provided which accepts user lightning commands, generates controls in accordance with predetermined operating policies and directs light fixtures to produce brightness, color, or directional pattern of the light emitted by the light fixtures. The lighting control system determines whether the light emitted by the light fixtures complies with government regulations, and building policies, and insures that controls are adjusted such that all regulations regarding lighting safety and working conditions, as well as building policy and energy management targets are adhered to. In addition, a way to reconcile conflicting user requests for lighting settings is provided.

19 Claims, 4 Drawing Sheets

(56) References Cited

U.S. PATENT DOCUMENTS

| | | | | |
|---|---|---|---|---|
| 2005/0110660 A1* | 5/2005 | Jacobs | ............... | G08G 1/07 340/944 |
| 2008/0074059 A1* | 3/2008 | Ahmed | ............. | H05B 37/0218 315/291 |
| 2009/0267540 A1* | 10/2009 | Chemel | ............... | F21V 29/763 315/297 |
| 2010/0270933 A1* | 10/2010 | Chemel | ............... | H05B 37/029 315/130 |
| 2011/0140611 A1* | 6/2011 | Elek | ............... | H05B 37/0272 315/130 |
| 2012/0235579 A1* | 9/2012 | Chemel | ............... | F21S 2/005 315/152 |
| 2012/0329474 A1 | 12/2012 | Seavey et al. | | |
| 2013/0038217 A1* | 2/2013 | Askin | ............... | H05B 37/0245 315/151 |
| 2013/0249409 A1* | 9/2013 | Vanwagoner | ...... | H05B 37/0245 315/154 |
| 2014/0001959 A1* | 1/2014 | Motley | ............... | H05B 37/02 315/149 |
| 2014/0035482 A1* | 2/2014 | Rains, Jr. | ........... | H05B 37/0254 315/294 |
| 2014/0167621 A1* | 6/2014 | Trott | ............... | H05B 37/0218 315/154 |
| 2014/0167653 A1* | 6/2014 | Chobot | ............... | H05B 37/029 315/362 |
| 2014/0265897 A1* | 9/2014 | Taipale | ............... | H05B 37/02 315/200 R |
| 2014/0354161 A1* | 12/2014 | Aggarwal | .......... | H05B 37/0245 315/153 |
| 2015/0022096 A1* | 1/2015 | Deixler | ............. | H05B 37/0218 315/153 |
| 2015/0084547 A1* | 3/2015 | Yeh | ............... | H04L 12/2807 315/312 |
| 2015/0237706 A1* | 8/2015 | Ben-Moshe | ....... | H05B 37/0272 315/294 |

OTHER PUBLICATIONS

Laherty, "Light-as-a-Service: Why IT and Lighting Will Converge," Cisco Blog > Enterprise Networks, Jun. 29, 2012, retrieved from http://blogs.cisco.com/enterprise/light-as-a-service-why-it-and-lighting-will-converge/, on Jul. 30, 2014, 6 pages.

Castle, "NuLEDs Launches PoE Lighting Solution for LEDs," CEPro, Jun. 28, 2012, retrieved from http://www.cepro.com/article/nuleds_launches_poe_lighting_solution_for_leds/, on Jul. 30, 2014, 3 pages.

nuLEDs, "PoE LED Lighting How It Works," retrieved from http://www.nuleds.com/technology.html, on Jul. 30, 2014, 3 pages.

Primex Wireless, "SNS™ Emergency Lights," Product Data Sheet, retrieved from www.primexwireless.com/uploads/files/SNS_Emergency_Lights.pdf, on Jul. 30, 2014, 2 pages.

\* cited by examiner

DISTRIBUTED CONTROL OF LIGHTS SUBJECT TO COMPLIANCE CONSTRAINTS

TECHNICAL FIELD

The present disclosure relates to control of lighting conditions in a space.

BACKGROUND

With light fixtures powered and controlled via a communication network, it is possible to provide building tenants, maintenance workers, and even visitors control over the light emitted in their space. Multiple users may "vote" to change the light in commonly used areas. However, users' preferences may be outside building codes and safety thresholds for illumination levels. In addition, conflicts between preferences of different users may arise.

DESCRIPTION OF EXAMPLE EMBODIMENTS

Overview

A lighting control system is provided which accepts user lightning commands, generates controls in accordance with predetermined operating policies, and directs light fixtures to produce brightness, color, or directional pattern of the light emitted by the light fixtures. The lighting control system determines whether the light emitted by the light fixtures complies with government regulations, and building policies, worker comfort targets, and insures that controls are adjusted such that all regulations regarding lighting safety and working conditions, as well as building policy and energy management targets are adhered to. In addition, a way to reconcile conflicting user requests for lighting settings is provided.

Example Embodiments

Commercial buildings are increasingly adopting smart building control methods. Their lighting infrastructure allows individual control of the light emitted from each light fixture. This includes control of the overall brightness, directional lighting pattern, color, and how these attributes change over time. The building managers and occupants have unprecedented control over the lighting, via light control panels and switches throughout the building, and via applications running on their computers and handheld devices. A local lighting control processor coordinates the user commands to control operation of light fixtures, checks the user commands against policies, and sends appropriate controls to the individual light fixtures.

Figure 1:
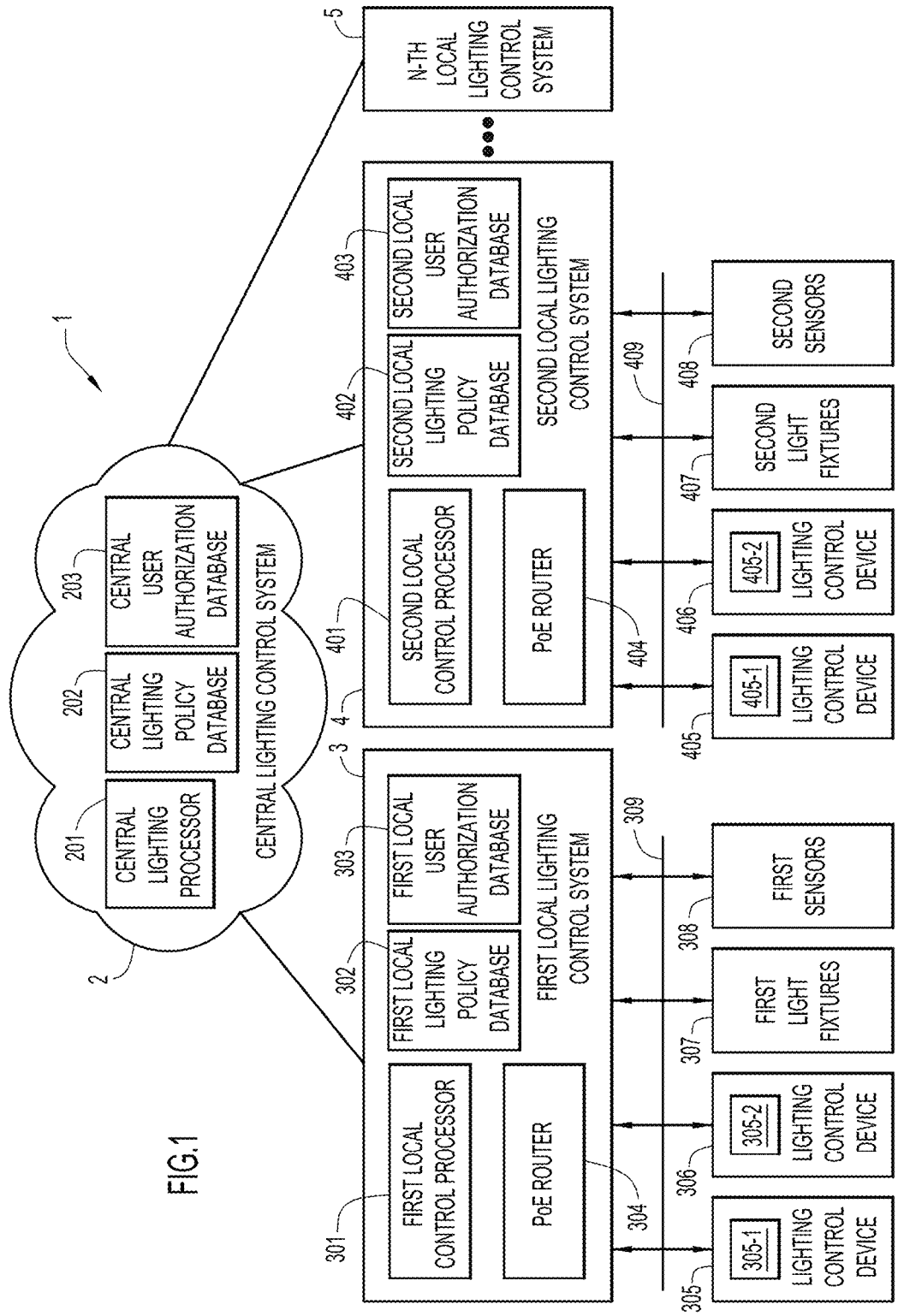
FIG. 1 is a block diagram of a lighting control system according to an example embodiment.

FIG. 1 is a block diagram of a lighting control system according to an example embodiment. As shown in FIG. 1, the lighting control system 1 includes a central lighting control system 2, a first local lighting control system 3 and a second local lighting control system 4. The central lighting control system 2 includes a central lighting processor 201, a central lighting policy database 202, and a central user authorization database 203.

The first local lighting control system 3 includes a first local control processor 301, a first local lighting policy database 302, a first local user authorization database 303, and a first Power over Ethernet (PoE) Router 304. First lighting control devices 305 and 306, a plurality of first light fixtures 307 and a plurality of first sensors 308 are connected to the first local lighting control system 3 via a first local communication network 309.

The second local lighting control system 4 may be configured in a similar manner as the first local lighting control system 3. As shown in FIG. 1, the second local lighting control system 4 includes a second local control processor 401, a second local lighting policy database 402, a second local user authorization database 403, and a second Power over Ethernet (PoE) Router 404. Second lighting control devices 405 and 406, a plurality of second light fixtures 407 and a plurality of second sensors 408 are connected to the second local lighting control system 4 via a second local communication network 409. The first and second local communication networks 309 and 409 may be part of a central communication network to which the central lighting control system 2 may also be connected.

As shown in FIG. 1, the lighting control system 1 is not limited to the first and second lighting control systems 3 and 4. Instead, the lighting control system 1 may also include a plurality of further local lighting control systems as indicated at reference numeral 5, in addition to the first and second lighting control systems 3 and 4.

Power over Ethernet (PoE) Router

In accordance with an example embodiment, Ethernet commands may be routed to a Power over Ethernet (PoE) router, such as first and second PoE routers 304 and 404 depicted in FIG. 1, that drive the light fixtures 307 and 407 associated with the user's command. The light fixtures 307 and 407 may be incandescent, florescent, or LED troffers mounted in the ceiling, track lights, floor lamps, task lights, or other types of fixtures. The PoE routers 304 and 404 may supply both energy and communication network functions over first and second communication networks 309 and 409, respectively, to each lighting fixture 307 and 407, using a hub and spoke star topology. When the light fixture 307, 407 receives the IP packet, it adjusts the brightness, color, and radiation pattern of the light it emits according to the commanded values.

Lighting Control Devices

Lighting control devices 305, 306, 405, and 406 may include any device through which a user can provide commands to system 1. These may be wall switches, control panels, smart phones, wearable devices, or computers used by building occupants, or terminals used by building managers.

Operations of the lighting control system 1 are now described with reference to FIGS. 2 and 3, and subsequent detailed examples and scenarios.

Figure 2:
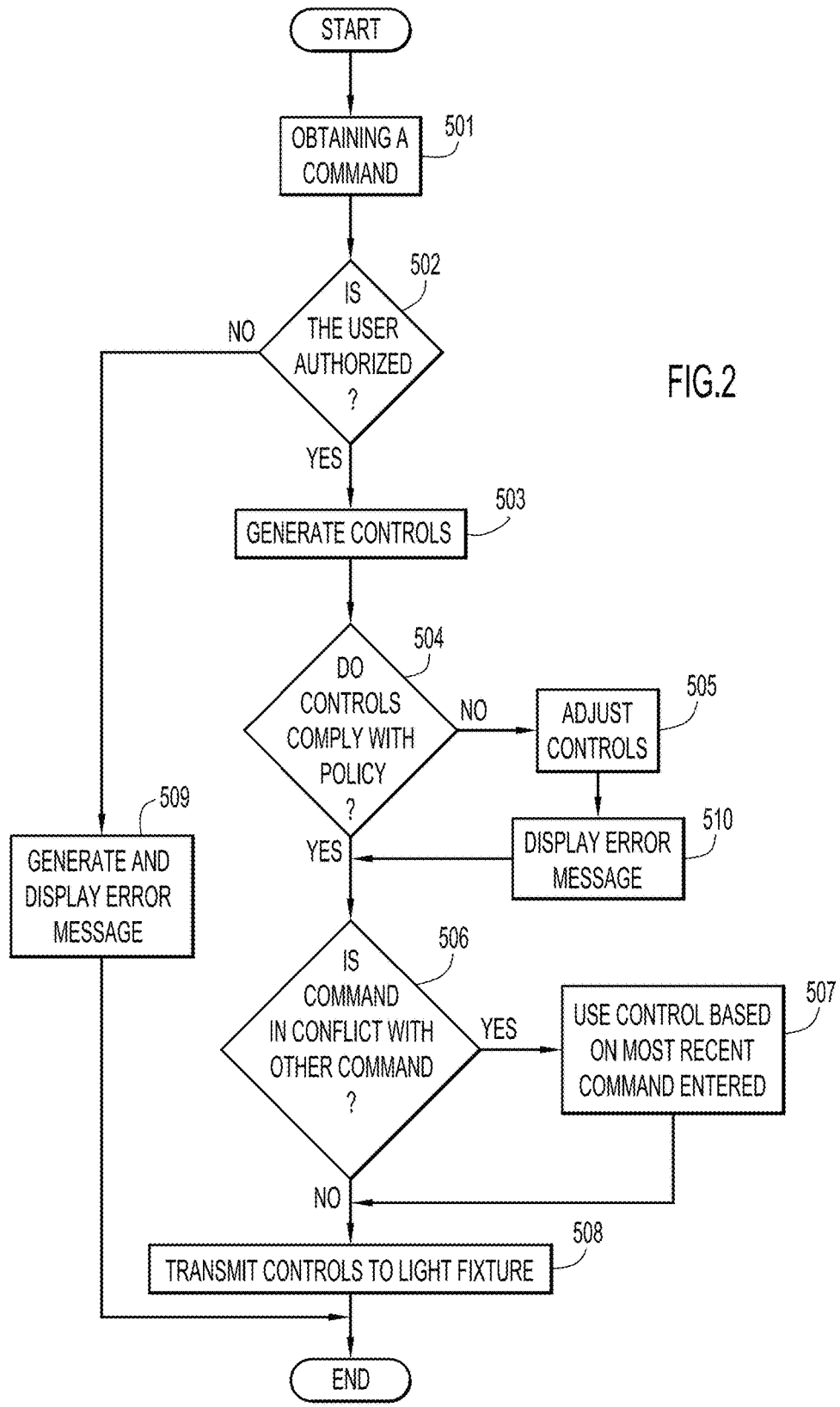
FIG. 2 is flow chart illustrating operations of a local control processor according to an example embodiment.

FIG. 2 is flow chart illustrating operations of a local control processor according to an example embodiment. FIG. 3 is flow chart illustrating operations of a local control processor according to another example embodiment.

As shown in FIG. 2, a command to control operation of at least one light fixture is obtained at 501. The local control processor determined whether a user is authorized to enter the command at 502. If not, at 509 (at 609 in FIG. 3) an error message is generated to the user, and the operation ends. Upon determination that the user is authorized to enter the command for a specific light fixture, control commands to control the light fixture are generated at 503 and if the controls comply with a predetermined operating policy (as determined at 504) and if the command obtained in operation at 501 is not in conflict with other commands obtained by the lighting system (as determined at 506) for the at least one light fixture, the controls are transmitted to the light fixture via a communication network at 508.

Upon determination that the controls generated in response to the command obtained in operation 501 do not comply with the predetermined operating policy, the controls are adjusted at 505. Upon determination that the command obtained in operation 501 is in conflict with other commands obtained by the lighting system for the at least on light fixture, controls are set to controls that correspond to a most recent command entered, for example, by a member of the building management team, at 507.

Figure 3:
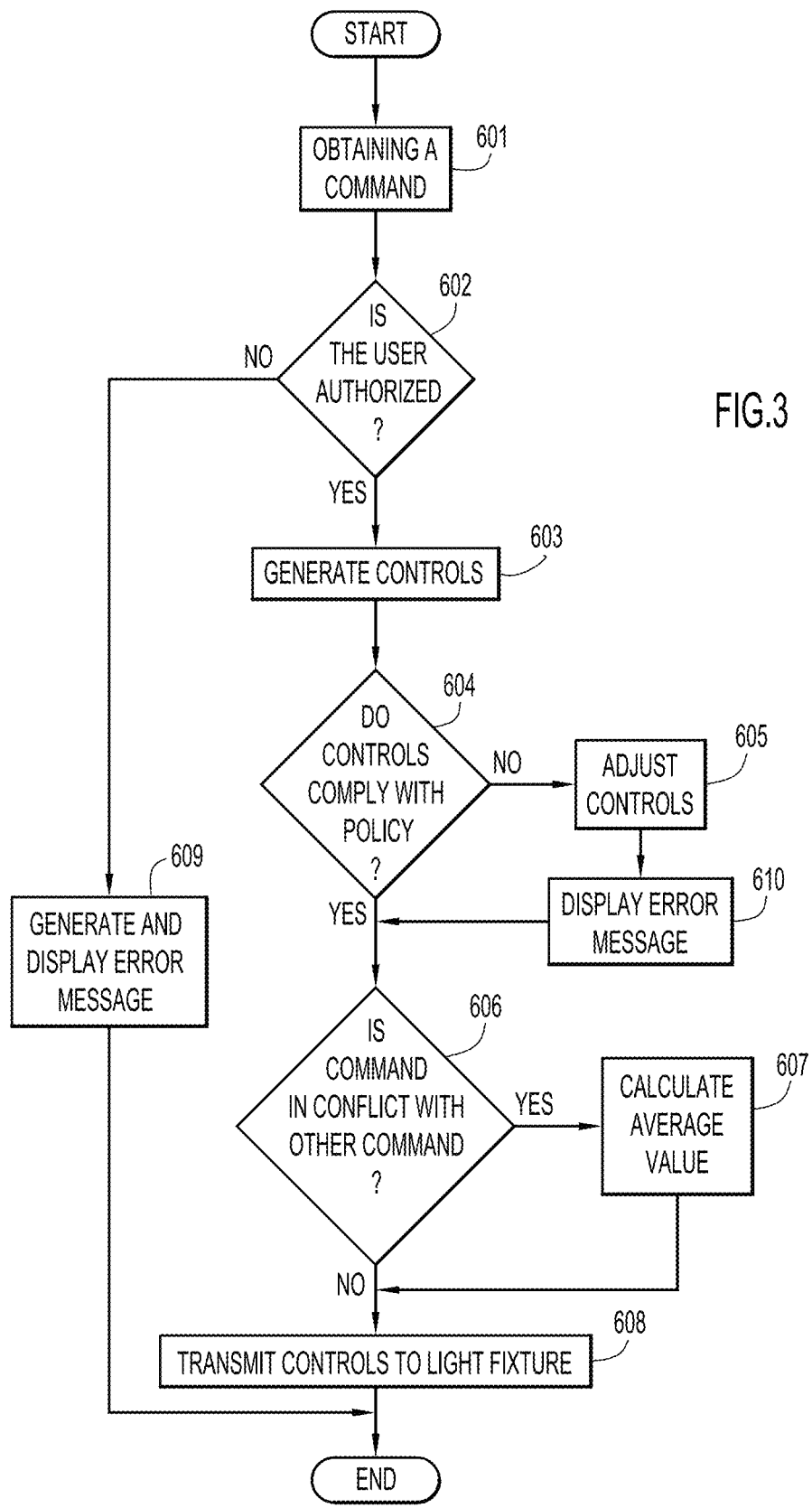
FIG. 3 is flow chart illustrating operations of a local control processor according to another example embodiment.

The flow chart in FIG. 3 is similar to the flow chart shown in FIG. 2. However, in operation 607 of FIG. 3, an average command value is calculated for a plurality of conflicting commands, whereas in operation 507 of FIG. 2, a first command (which may have been first entered by a member of the building management team) may override all conflicting commands entered by a plurality of users.

Since operations 601-606 and 608 in FIG. 3 correspond to operations 501-506 and 508, a detailed description of these operations is omitted.

In the example embodiment shown in FIG. 3, however, upon determination that the command obtained in operation 601 is in conflict with other commands obtained by the lighting system for the at least one light fixture (606: YES), an average command value for all commands entered is calculated (607) and transmitted to the light fixtures (608). According to this example embodiment, the lighting control system may collect inputs for a predetermined period of time, i.e., may wait for a pre-set timeout to calculate a running average command value for all commands entered during the predetermined period of time in order to adjust the command value representing, for example, a brightness, a directional lighting pattern, or a color of light emitted by the light fixture.

A lighting control chain starts with an occupant of the space or building manager providing user inputs to a lighting control device. Users may have specific objectives in regard to lighting control of the space. Building managers may want to minimize energy consumption (for example by dimming or turning off lights in unoccupied areas), or provide certain lighting scenes to enhance the operation of the building (for example, by providing bright, exciting light effects to highlight architectural features or set a specific mood in the space). Building managers may also be responsible for complying with all relevant lighting regulations, for example insuring emergency and exit lights meet minimum standards, and insuring task lighting levels comply with government regulations.

Occupants of a space may want precise control over the lighting in the areas where they spend their time. For example, an occupant doing detailed work (a dental procedure, for example, or crafting jewelry) may want very bright light on specific areas of their work station. In a retail space, the lighting plan, brightness and color temperature may be carefully selected to best highlight the merchandise (clothes, cosmetics, cars, restaurants, clubs, etc. may all require different lighting plans to optimize their sales). Some situations may require lights to be brighter or dimmer than other situations (watching or shooting videos, for example). Certain exceptional situations may require very colorful or animated settings for certain lights (for example to celebrate an anniversary or a championship sports team).

Reference is made again to FIGS. 1-3 for descriptions of additional example scenarios. A user may input a command into a first user interface 305-1 of a first lighting control device 305 to enable the first lighting control system to obtain the command as illustrated in operations 501 and 601 in FIGS. 2 and 3. In on example, a building automation control screen used by the manager, a smart wall switch, or a room-level control panel that provides the same functions as traditional switches and dimmers, plus additional options may be provided as lighting control devices. Commands may also be obtained via a handheld smart device (tablet, smartphone) carried by the occupant, or a wearable device, where a special application allows one to log into the building's lighting control system and to make changes.

In accordance with another example, gesture or voice recognition, may be used to provide input commands into the first local lighting control system 3 based on sensors 308, such as surveillance cameras, to detect the voice or the gesture. The command may be transmitted from the first lighting control device 305 via the first local communication network 309 to the first local lighting control system 3.

When a mobile control device serves as a lighting control device, in operations 502 and 602, the lighting control system may use the mobile control device user's identity and location to determine whether the user is authorized to enter a command. The user's identity, along with privileges, home cubicle location, etc. may be relayed to the system over the first local communication network 309 by the application running on the mobile device. In addition, indoor localization technology (using various location techniques in a Wi-Fi™ or other wireless network, for example), may be used to determine the user's exact location in the building, and to provide control options for the light fixtures 307 that may be located directly overhead of the user. Such locations in the building may include labs, conference rooms, or common areas.

Once the user commands are collected by the input devices, the commands are relayed to a building lighting control system, such as the first local lighting control system 3, that manages lighting for a large set of light fixtures 307. The building lighting control system 3 serves as a local lighting control system and may control light fixtures of an entire building. Alternatively, the building may also be subdivided down to floors, wings, regions, etc., and a local lighting control system may be provided for each floor, wing, or region.

Figure 4:
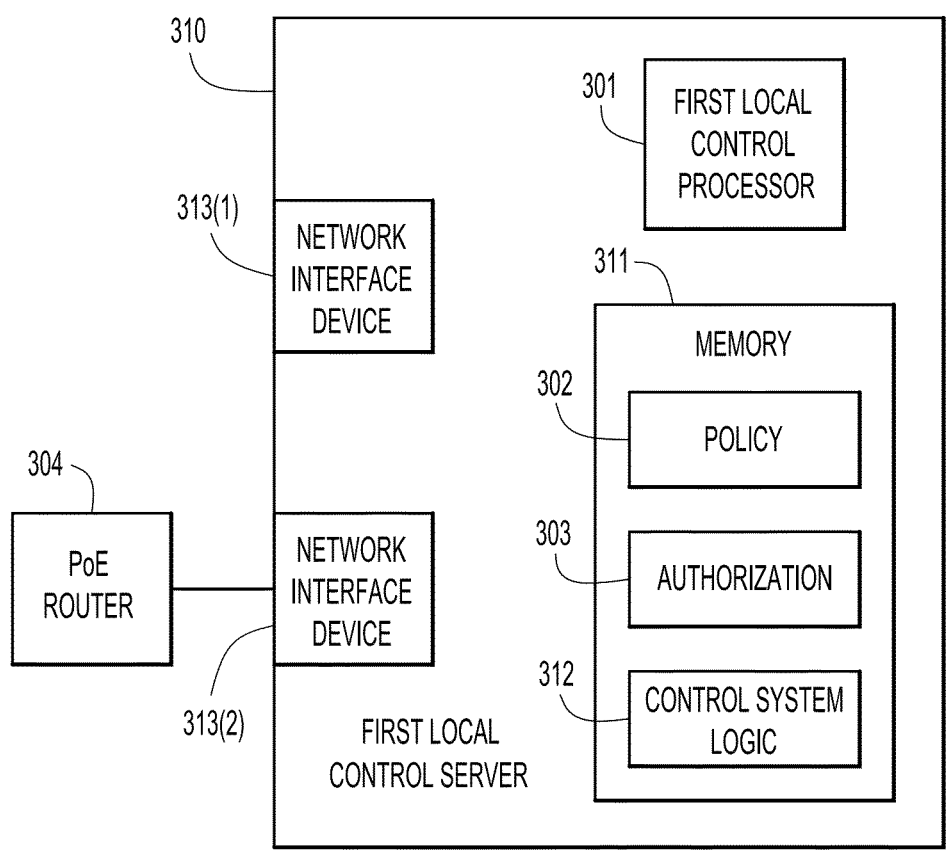
FIG. 4 is a block diagram of a server on which a portion of the first local lighting control system may be implemented, according to an example embodiment.

As described above, the local lighting control systems, such as the first local lighting control system 3, or the second local lighting control system 4, may include a number of local control processors, such as the first and second local control processors 301 and 402, policy engines that include policy databases, such as first local lighting policy database 302 and second local policy database 402, routers, such as first and second PoE routers 304 and 404, and other elements. The local control processor then applies a set of rules, i.e., predetermined operating policy rules to insure that the user's commands are in accordance with the predetermined operating policy, as illustrated in FIGS. 2 and 4 by operations 504 and 604. If they are, the processing continues. If they are not, the user's commands may be adjusted (operation 505) which may include that the commands are blocked (and an error message 509, 609 may be generated to the user), or overridden (if the user has appropriate authority). The local control processor 301 may format the filtered commands, i.e., the commands that comply with the predetermined operating policy, into IP packets, and the IP packets may be sent to the building's Ethernet network to be relayed to the light fixtures. See operations 508 and 608 in FIGS. 2 and 3.

The building lighting control system may also communicate with a cloud-based central lighting control system, such as the central lighting control system 2, as shown in FIG. 1, to update its policy engines, report statistics, request maintenance, coordinate energy usage and lighting plans across multiple control systems (for example on a campus or district of a city) and to perform other cloud-based functions.

In accordance with an example embodiment, if a user requests that all lights on a floor be switched off, there may be regulatory requirements that a subset of the lights be left on to always provide exit and emergency lighting. The local lighting control processor may respond to the command and switch off most of the fixtures in the area except for a few strategically located ones (near exits or stairwells) may be left on to comply with the regulations. Similarly, if the user requests all lights to be full bright even though the policy engine knows it is a sunny day and the windows and skylights in the space should provide adequate general lighting, the local lighting control processor may try to determine what the user is trying to accomplish, and configure a few nearby fixtures to full brightness, and other fixtures in the area to partial brightness to save energy. Some user requests may be denied based upon building policy. For example, if for some reason a user requests all lights on a floor turn orange, the lighting system may determine this is inappropriate, and only send the orange command to the light fixture immediately above that user's assigned cubicle.

The local lighting control processor 301 may also be referred to as a "Fog" node. Such Fog nodes may include processing, networking and storage elements necessary to provide local control of the lighting, and may not be subject to the latency, network loading, security, or reliability constraints often encountered in pure cloud based control system. In accordance with an exemplary embodiment, Fog computing may be similar to cloud computing, but the processing and storage is "closer to the ground". Accordingly, the Fog node is typically implemented in or near the edge routing device that terminates the links to the light fixtures. The local nature of the Fog nodes can allow the lighting control services to continue to operate from local processors 3 and 4 even if central lighting control system 2 is unreachable due to network faults, or is overloaded to the point the service is objectionably slow.

Consensus-Based User Control of Environmental Conditions

According to one example embodiment, environmental conditions may be adjusted based on consensus (average) of users preferences in a given area or space. Environmental conditions may include but are not limited to light, temperature, etc.

Numerous building users may have a GUI interface on an iPhone or other computer device, which can serve as lighting control devices, such as the first local lighting control device 305 shown in FIG. 1. The user interface 305-1 may allow the user to select a preferred light color, light intensity or other light variable. When the user selects their preference for the light, the local control processor 301 captures and records the preference. The first local control processor 301 then adds the preference to the settings entered by others over a past interval, such as the previous eight hours, and divides the result by the total number of users. This determines an "average" preference. Such an "average" preference may be calculated and used as a control, as shown in operation 607 in FIG. 3.

In general, a network may be provided to collect multiple inputs from users, aggregate those inputs and reflect the output in lights, sounds, etc. In the case of a stadium, for example, the light color may be recorded using a mood ring that assigns a number to each color, and an "average" color may be projected through the facility lights. According to this example embodiment, a multi-color accent ring may be displayed at the top of the stadium. Likewise, a microphone might be used to pick up the sound level and to project the sound level through the light intensity setting.

In a similar way, users in a building can set their light level preference to cast a "vote" for light settings. As a result, the users may "democratically" vote for the building performance. Building maintenance teams may set "minimum acceptable levels" to comply with local building codes.

By using a wireless mobile device as a lighting control device, users in a building may set their light brightness level, or color preference, in order to determine the light settings in a "democratic" way. That is possible because almost all users have a GUI interface on a Smartphone, tablet, wearable computer, or other network-connected device. The interface may pop out with a window, which allows the user to select a preferred light brightness, light color, or other light variable. When the user selects a preference for the light, the wireless device of the user may collect the selection and quantify it as a value. Then the wireless device may communicate with the local lighting control processor. The local lighting control processor 301 may then continue to collect the preference to the settings entered by others in a given time frame. Then the local lighting control processor 301 runs different policies to calculate the final selection. Possible policies may include, but are not limited to:

1. Normal average policy: taking the sum of all received preference selections, and dividing the sum evenly by the total number of users who have participated in the voting.

2. Weighted average policy: taking the sum of all received preference selections multiplied by weight, and then dividing the weighted sum evenly by the total number of users who have participated in the voting. The weight could be determined by the importance of the user within a family or business organization, i.e., the votes of senior managers takes priority over employees lower in the hierarchy of the business organization. The elapsed time since a preference selection vote was received can also factor into the weight, with the most recent requests being weighted more heavily than older requests.

3. Filtered average policy: calculating the mean and variance of all received user inputs, and setting a confidence interval based on the mean and variance. This may involve excluding all the values that do not fall in the confidence interval, and then taking the average. By filtering out those extreme values, certain users may be efficiently prevented from intentionally setting inappropriate values. This operation may also be performed in the GUI interface on a mobile lighting control device. The GUI interface may define command values that users may select. The building facilities management team may set "minimum acceptable levels" to comply with local building codes, and the "minimum acceptable levels" can be stored in the GUI interface.

In accordance with an exemplary embodiment, user "votes" may also be processed in a centralized fashion or in a distributed fashion, which means users may vote for the setting of all the facilities, or only vote for the setting of local facilities. For example, a conference room may be equipped with multiple lights emitting diode (LED) PoE fixture with LiFi™ capability. Each user may be covered by one LiFi device, and each user may communicate with a server via the LiFi device. In a centralized fashion, all users may jointly determine the color and brightness of all LED lights in the conference room. In a distributed fashion, all users may only vote for the LED light that they are connected with. The building facility management team may determine which mode to run in the conference room.

Management overriding

If a management team in a business organization is also setting up the parameters at the same time with the users, then the management team has the authority to override the request of the users, and the users would receive certain messages to explain the intention. In other words, the controls are set to first controls determined based on commands entered by the management team, as shown in operation 507 in FIG. 2.

User Authorization

The central lighting control processor 201 may maintain a hashtable for each lighting object and store it in central user authorization database 203. Each hashtable may contain identifiers for the authorized personnel that could modify or access each of the attributes of the lighting. Identifiers for persons on a management team for a business organization may be in the hashtable for all lighting. A normal user is in the hashtable of the lighting which is close to his/her cubicle, etc. For some properties, the lighting hashtable may change dynamically. For example, if user A and user B have booked a conference room between 3-5 pm, then both user A and B may be added into the hashtable of the lighting in that conference room between 3-5 pm. After 5 pm, they will be removed from the list unless requested otherwise. In the preferred embodiment, the hashtable is stored in the local Fog processor for quick access. However, elements of this hashtable could also be synchronized with a master table in the central lighting control system, so, for example, when employees visit a different building, their authorizations can move with them.

The central lighting processor may also store general lighting policies in a central lighting policy database 202. Some of the lighting policies may be time of day or day of the week dependent. Fewer lights could be required as a minimum if the building is largely unoccupied, or if natural lighting is abundant. Users may be allowed more freedom over the brightness of their local lights early or late in the day ("stay at partial brightness until I finish my coffee"), where midday may be subject to more tightly constrained illumination level regulations. When a user specifies the parameters for the lighting, i.e., enter a command, the user may also denote the time length that the request is valid. For example, when the central processor is running the default level for a lighting fixture, one user may set some parameters and may specify that, after N hours, the request is expired. N hours later, the requested parameters may be removed, and the default level may come back.

Some of the regulations may specify minimum illumination levels in the space, and may not necessarily have a direct relationship with the parameters for the lighting specified by the user for one or more light fixtures. Intelligent buildings may close the feedback loop for these situations, allowing sensors to measure the actual illumination levels achieved, and adjusting the lights to most efficiently maintain them. These sensors may be photometers integrated into the light fixtures or control panels, or the output of security cameras, or a special feature of the lighting control app the occupants use. A smartphone's camera may be used as a light meter to measure the actual illumination in a space, and the controller ramps up nearby fixture's outputs until the exact commanded illumination level is achieved, and those settings are saved. This closed-loop control can insure the optimal lighting levels are achieved throughout the space, exactly optimizing the lighting system's uniformity, energy usage, and insuring all minimum lighting regulations are complied with throughout the building. This active feedback can also partially compensate for faults. For example if a single light fixture fails, adjacent fixtures can increase their brightness until the required illumination levels are measured everywhere in the room.

The central lighting policies may be transmitted from the central lighting policy database 202 to local lighting policy databases 302 and 403 in the local lighting control systems to update local lighting policies.

The control loop may have some convergence latency. Fortunately, the local Fog processor is only one or two network hops away from the control devices and PoE light fixtures, so network latency is likely not a factor. If a sensor is a security camera, the feedback loop may run at 10-20 Hz or better (depending upon video compression latency). Using simple successive approximation techniques, the convergence time to better than 1% would be less than 7 loop cycles or 700 ms. By applying illumination model based heuristics to the initial settings, the convergence time can be reduced to less than ~200ms, which would probably be unperceivable.

The local control processor 301 may collect the usage information over time for all the lighting fixtures. For example, information such as at the time, season, brightness of the light is, color settings, etc., could be stored in the central database in the cloud-based lighting control application. A data-mining program may run based on the historical data from the database, to predict a value for different lighting. When a person is setting up the parameters for the lighting, the central processor could automatically fetch the data from the database and calculate all the parameters using data-mining as a background event. All the lights will be adjusted to a default level based on the background event. The default level could be overridden by other user's valid input.

Although the techniques are illustrated and described herein as embodied in one or more specific examples, it is nevertheless not intended to be limited to the details shown, since various modifications and structural changes may be made within the scope and range of equivalents of the claims.

The above described lighting control systems are, at least partially, implemented in hardware/software on one or more computing devices. FIG. 4 is a block diagram illustrating one example in which the first local lighting control system 3 is, at least partially, implemented on a local control server 310, for example. This diagram is representative of any of the local lighting control systems shown in FIG. 1.

Memory 311 may comprise read only memory (ROM), random access memory (RAM), magnetic disk storage media devices, optical storage media devices, flash memory devices, electrical, optical, or other physical/tangible memory storage devices. The first local control processor 301 is, for example, a microprocessor or microcontroller that executes instructions for the first local lighting control system logic 312.

Thus, in general, the memory 311 may include one or more tangible (non-transitory) computer readable storage media (e.g., a memory device) encoded with software comprising computer executable instructions and when the software is executed (by the first local control processor 311) it is operable to perform the operations described herein in connection with the generation, adjustment and transmission of the controls used to control the light fixtures and the user authorization, for example. In addition, first local lighting policy database 302 and first local user authorization database 303 may be stored in memory 311.

Local control server 310 may further include network interfaces 313(1) and 313(2). In an example embodiment, local control server 310 may be connected to the central lighting control system 2 via network interface 313(1) and to first Power over Ethernet (PoE) Router 304 via network interface 313(2).

To summarize, a lighting control system is provided which accepts user lightning commands, generates controls in accordance with predetermined operating policies and directs light fixtures to produce brightness, color, or directional pattern of the light emitted by the light fixtures. The lighting control system determines whether the light emitted by the light fixtures complies with government regulations, and building policies, worker comfort targets, and insures that controls are adjusted such that all regulations regarding lighting safety and working conditions, as well as building policy and energy management targets are adhered to. In addition, a way to reconcile conflicting user requests for lighting settings is provided.

In accordance with one aspect of an example embodiment, the lighting control system provides local intelligence to manage the lighting of a building and ensures that government-mandated lighting rules are enforced, such as rules related to exit and emergency lightings and minimum task illumination levels.

In accordance with another aspect of an example embodiment, the lighting control system enforces building lighting policies, insures that energy conservation targets are met, architectural aesthetics are appropriately observed, and that no occupant selects a lighting plan that may be in conflict with requests for lighting settings of other occupants.

In accordance with yet another aspect of an example embodiment, the lighting control system provides active control loops between measured illumination levels and the settings of individual light fixtures, optimizes lighting uniformity, regulatory compliance, and energy efficiency. The lighting control system allows dynamic lighting policies that change based upon time of day or day of the week manages default lighting levels based upon cloud-based statistics of past settings and similar installations, allows time triggered events, for example setting a lighting level change for a fixed time interval, and automatically restoring default levels when it expires. In addition, the lighting control system gives building occupants the maximum control possible (but no more) over their lighting environment.

The above description is intended by way of example only.

What is claimed is:

1. A method comprising:
    obtaining at least one command including a first command and a second command to control operation of the same at least one light fixture connected to a lighting control system;
    responsive to the at least one command, generating controls in accordance with a predetermined operating policy such that upon determining that there is a conflict between a first attribute value of the first command and a second attribute value of the second command, either calculating an average attribute value from the first attribute value and the second attribute value and generating the controls based on the average attribute value or generating the controls based on the first attribute value; and
    transmitting the controls to the at least one light fixture via a communication network, wherein the lighting control system comprises a first local lighting control system, at least a second local lighting control system and a central lighting control system connected to the first and the at least second local lighting system, wherein the at least one light fixture is connected to the first local lighting system and the first local lighting system comprises a first local control processor and at the least one lighting control device, and
    wherein the at least one command is obtained by the at least one lighting control device and relayed to the first local control processor via the communication network to generate the controls in accordance with the predetermined operating policy.

2. The method of claim 1, further comprising:
    maintaining in the first local lighting control system data indicating whether a user is authorized to change an operation of a light fixture in the first local lighting control system;
    determining whether the at least one command is input by the user;
    generating the controls in accordance with the predetermined operating policy and transmitting the controls to the at least one light fixture if the user is authorized to input the at least one command, and
    generating and displaying an authentication error message if the user is not authorized to input the at least one command.

3. The method of claim 1, wherein the generating the controls in accordance with the predetermined policy further comprises:
    upon determining that light emitted by the at least one light fixture in response to the at least command complies with lighting related government regulations, local lighting related policies and general lighting related policies, generating the controls in accordance with the at least one command;
    upon determining that the light emitted by the at least one light fixture in response to the at least one command does not comply with the lighting related government regulations, the local lighting related policies and the general lighting related policies, adjusting the controls and generating for display an adjustment error message.

4. The method of claim 3, further comprising:
    setting the general lighting related policies in the central lighting control system and transmitting data for the general lighting related policies to the first local lighting control system; and
    overriding the local lighting related policies with the general lighting related policies.

5. The method of claim 3, further comprising:
    collecting, by the first local control processor, data about light emitted by all light fixtures connected to the first local lighting system during a predetermined period of time;
    transmitting the collected data to the central lighting control system;
    storing the collected data in the central lighting control system;

adjusting the general lighting related policies based on the collected data, and adjusting the controls in accordance with the general lighting related policies.

6. The method of claim 1, wherein the first local lighting control system comprises a building lighting system, wherein the at least one light fixture comprises a troffer light mounted in a ceiling, a track light, a floor lamp and a task light, wherein the at least one lighting control device comprises at least one of a wall switch, a room-level control panel, a handheld smart device, a wearable smart device, a personal computer, building manager computer, a gesture recognizer, a voice recognizer, or a light sensor; and wherein the controls control a brightness, a color and a radiation pattern of light emitted by the at least one light fixture.

7. The method of claim 1, wherein the communication network provides power to the at least one light fixture.

8. A system comprising:

a first local lighting control system and at least a second local lighting control system;

a central lighting control system connected to the first and the at least second local lighting system;

at least one light fixture, at least one lighting control device and a first local control processor connected to the first local lighting system, wherein the first local control processor:

receives at least one command including a first command and a second command obtained by the at least one lighting control device to control operation of the same at least one light fixture, responsive to the at least one command, generates controls in accordance with a predetermined operating policy such that upon determining that there is a conflict between a first attribute value of the first command and a second attribute value of the second command, either calculates an average attribute value from the first attribute value and the second attribute value and generates the controls based on the average attribute value or generates the controls based on the first attribute value; and causes the controls to be transmitted to the at least one light fixture via a communication network.

9. The system of claim 8, wherein the at least one command is obtained by the at least one lighting control device and relayed to the first local control processor via the communication network to generate the controls in accordance with the predetermined operating policy.

10. The system of claim 9, wherein the first local lighting control system comprises a memory to store data indicating whether a user is authorized to change an operation of a light fixture in the first local lighting control system;

wherein the first local control processor:

determines whether the at least one command is input by the user;

generates the controls in accordance with the predetermined operating policy and transmits the controls to the at least one light fixture if the user is authorized to input the at least one command; and generates and displays an authentication error message if the user is not authorized to input the at least one command.

11. The system of claim 9, wherein the first local processor:

generates the controls in accordance with the at least one command upon a determination that light emitted by the at least one light fixture in response to the at least one command complies with lighting related government regulations, local lighting related policies and general lighting related policies to control the operation of the at least one light fixture, and generates and displays an adjustment error message upon a determination that the light emitted by the at least one light fixture in response to the at least one command does not comply with the lighting related government regulations, the local lighting related policies and the general lighting related policies.

12. The system of claim 11, wherein the first local control processor:

sets the general lighting related policies in the central lighting control system and causes data for the general lighting related policies to be transmitted to the first local lighting control system; and overrides the local lighting related policies with the general lighting related policies.

13. The system of claim 11, wherein the first local control processor:

collects data about light emitted by all light fixtures connected to the first local lighting system during a predetermined period of time, and causes the collected data to be transmitted to the central lighting control system, and wherein a central control processor of the central lighting control system:

stores the collected data in the central lighting control system;

adjusts the general lighting related policies based on the collected data, and adjusts the controls in accordance with the general lighting related policies.

14. The system of claim 8, wherein the first local lighting control system comprises a building lighting system, wherein the at least one light fixture comprises at least one of a troffer light mounted in a ceiling, a track light, a floor lamp or a task light;

wherein the at least one lighting control device comprises at least one of a wall switch, a room-level control panel, a handheld smart device, a wearable smart device, a personal computer, building manager computer, a gesture recognizer, a voice recognizer, or a light sensor; and wherein the controls control a brightness, a color and a radiation pattern of light emitted by the at least one light fixture.

15. The system of claim 8, wherein the communication network provides power to the at least one light fixture.

16. One or more non-transitory computer readable storage media encoded with software comprising computer executable instructions and when the software is executed operable to:

receive at least one command including a first command and a second command obtained by at least one lighting control device to control operation of the same at least one light fixture connected to a lighting control system;

responsive to the at least one command, generate controls in accordance with a predetermined operating policy such that upon determining that there is a conflict between a first attribute value of the first command and a second attribute value of the second command, either calculate an average attribute value from the first attribute value and the second attribute value and generate the controls based on the average attribute value or generate the controls based on the first attribute value; and cause the controls to be transmitted to the at least one light fixture via a communication network, wherein the lighting control system comprises a first local lighting control system, at least a second local lighting control system and a central lighting control system connected to the first and the at least second local lighting system, the at least one light fixture being connected to the first local lighting system, the first local lighting system comprising a first local control processor and at the least one lighting control device, and wherein the at least one command is relayed to the first local control processor via the communication network to generate the controls in accordance with the predetermined operating policy.

17. The non-transitory computer readable storage media of claim 16, and further comprising instructions operable to:

store data indicating whether a user is authorized to change an operation of a light fixture in the first local lighting control system;

determine whether the at least one command is input by the user;

generate the controls in accordance with the predetermined operating policy and transmits the controls to the at least one light fixture if the user is authorized to input the at least one command; and generate and display an authentication error message if the user is not authorized to input the at least one command.

18. The non-transitory computer readable storage media of claim 16, and further comprising instructions operable to:

generate the controls in accordance with the at least one command upon a determination that light emitted by the at least one light fixture in response to the at least command complies with lighting related government regulations, local lighting related policies and general lighting related policies to control the operation of at least one light fixture; and generate and display an adjustment error message upon a determination that the light emitted by the at least one light fixture in response to the at least one command does not comply with the lighting related government regulations, the local lighting related policies and the general lighting related policies.

19. The non-transitory computer readable storage media of claim 18, and further comprising instructions operable to:

set the general lighting related policies in the central lighting control system and transmits data for the general lighting related policies to the first local lighting control system; and override the local lighting related policies with the general lighting related policies.

* * * * *